(12) United States Patent
Punzenberger et al.

(10) Patent No.: US 8,090,001 B2
(45) Date of Patent: Jan. 3, 2012

(54) FAST FREQUENCY-HOPPING TRANSCEIVER AND METHOD

(75) Inventors: Manfred Punzenberger, Villach (AT); Stefano Marsili, Furnitz (AT); Andreas Wiesbauer, Portschach (AT); Christoph Sandner, Villach (AT); Yossi Erlich, Hod Hasharon (IL)

(73) Assignee: Lantiq Deutschland GmbH, Neubiberg (DE)

( * ) Notice: Subject to any disclaimer, the term of this patent is extended or adjusted under 35 U.S.C. 154(b) by 1009 days.

(21) Appl. No.: 11/294,213

(22) Filed: Dec. 5, 2005

(65) Prior Publication Data

US 2006/0120435 A1 Jun. 8, 2006

Related U.S. Application Data

(60) Provisional application No. 60/633,079, filed on Dec. 3, 2004.

(51) Int. Cl.
*H04B 1/713* (2011.01)
(52) U.S. Cl. ........................................................ 375/132
(58) Field of Classification Search .................. 375/130, 375/132, 135, 136, 295, 316
See application file for complete search history.

(56) References Cited

U.S. PATENT DOCUMENTS

| | | | | |
|---|---|---|---|---|
| 4,792,768 A | * | 12/1988 | Fried et al. | 331/11 |
| 5,646,963 A | * | 7/1997 | Dent | 375/340 |
| 5,923,761 A | | 7/1999 | Lodenius | |
| 6,018,650 A | * | 1/2000 | Petsko et al. | 455/234.1 |
| 6,381,053 B1 | * | 4/2002 | Fathallah et al. | 398/99 |
| 6,717,995 B2 | * | 4/2004 | Zvonar | 375/340 |
| 6,785,556 B2 | * | 8/2004 | Souissi | 455/557 |
| 7,263,333 B2 | * | 8/2007 | Roberts | 455/67.13 |
| 7,634,034 B2 | * | 12/2009 | Larsson | 375/362 |
| 7,697,641 B2 | * | 4/2010 | Haddadin et al. | 375/340 |
| 2002/0044014 A1 | * | 4/2002 | Wright et al. | 330/2 |
| 2003/0050029 A1 | * | 3/2003 | Kaufmann et al. | 455/260 |
| 2004/0013177 A1 | | 1/2004 | Sorrells et al. | |

FOREIGN PATENT DOCUMENTS

| | | |
|---|---|---|
| WO | WO 98/15105 | 4/1998 |
| WO | WO 99/18744 | 4/1999 |
| WO | WO 02/05513 | 1/2002 |
| WO | WO 02/056488 | 7/2002 |
| WO | WO 03/063461 | 7/2003 |

* cited by examiner

*Primary Examiner* — Kevin M Burd
(74) *Attorney, Agent, or Firm* — Eschweiler & Associates, LLC

(57) ABSTRACT

A fast frequency-hopping transceiver comprises a RF-unit arranged on a first chip, a base-band unit on a second chip, a bidirectional operable data and control interface arranged between said first and said second chip having at least one data line for data communication, at least one control line for controlling the data communication and at least one clock line for providing a clock signal, memory means implemented within said RF-unit containing all the required chip settings which are specific to a certain frequency of received and/or transmitted data being part of the intended hopping sequence. The transceiver also includes control means for programming said memory means during an initialization phase during a set-up of a communication link of said data communication.

14 Claims, 7 Drawing Sheets

FAST FREQUENCY-HOPPING TRANSCEIVER AND METHOD

RELATED APPLICATIONS

This application claims the benefit of U.S. Provisional Patent Application Ser. No. 60/633,079, filed Dec. 3, 2004, the disclosure of which is incorporated herein by reference in its entirety.

BACKGROUND OF THE INVENTION

1. Field of the Invention

The invention relates in general to transceivers having generic data and control interface between a RF-unit (RF=radio frequency) and a base-band unit (BB=base band) of a fast frequency-hopping transceiver especially in an OFDM based communication system (OFDM=orthogonal frequency division multiplexing). The transceiver may be a UWB based transceiver (UWB=ultra wideband).

This invention is specifically related to realizing a multi-band OFDM UWB-transceiver that obeys the evolving multi-band OFDM standard (MB-OFDM). This multi-band OFDM standard is based on fast frequency hopping between frequency bands.

2. Technical Background

The multi-band OFDM communication is based on multi-point to multi-point type of communication. In this type of communication a set of transceivers are coupled together defining a local network, e.g. a wireless local area network (WLAN). Several transceivers belonging to the same wireless local area network use the same frequency spectrum and thus use the same data transmission channel by means of time domain sharing. This method is referred to as TDMA (TDMA=time domain multiple access).

In this communication system at any specific time only one transceiver is allowed to transmit data. Accordingly, the data communication between the different transceivers is burst like, that is the transmitting transceiver sends the data information to the receiving transceiver by means of several data transmission bursts. For supporting the receiving transceiver to identify these data transmission bursts and for extracting the delivered data information therein the transmitting transceiver sends a predefined preamble preceeding the data portion of the data transmission burst. Every receiving transceiver within the wireless local area network has no previous knowledge of the received bursts. This lack of knowledge includes the timing of the burst, the identity of the sender, and consequently the received signal level.

However, the receiving transceiver comprises a preamble detection unit that identifies the preamble and thus identifies the data transmission bursts. The transceiver uses further the preamble for estimating data transmission and channel parameters such as channel response and carrier and timing offsets that are needed for the extraction of the data information extraction. The predefined preamble preceding every data transmission bursts assists the receiver to detect the existence of this preamble and to extract parameters that enable demodulation, decoding and data extraction. Among the extracted parameters within the preamble there are parameters that are significant for the tuning of the analog front end (AFE) of the transceiver such as the level of the AGC unit (AGC=automatic gain control) and the timing of a so-called frequency hopping.

To perform this task an interface arranged between the AFE-unit of the transceiver and the base-band unit of the transceiver is needed which is designed to enable fast detection and acquisition of the necessary parameters within the preamble detection within a relatively short time period.

A radio communication link consists at least of the following communication (interface) units: a transmitter performing the pre-equalization and a receiver performing an automatic gain control (AGC), an analog signal level detection, a DC-offset cancellation. Moreover, both units (i.e. the transmitter and the receiver) have to perform frequency hopping which is in particular difficult for the receiving unit. To perform the above mentioned task, consequently it is a challenge to fulfill the following requirements of the transmitter and receiver, respectively.

Pre-Equalization (Within Transmitter):

In terms of the transceiver performance—that is the achievable data rate and/or the achievable range—it is desired to transmit as much power as allowed. However, the regulation authorities such as the FCC in the USA limit the allowed transmitted power spectrum density (PSD). Therefore, it is desired to transmit the maximum power in each band without violating the regulation limit.

The analog transmitting path including the antenna is characterized by a different gain in each transmitted frequency band. Therefore, for obtaining improved performances of the data transmission it is necessary and advantageous to provide a transmitter having a different gain for every transmitted frequency band. For the realization of this transmitter a fast data communication between the two units of the communication system is needed.

AGC (Within Receiver):

A similar, however more complex problem exists with the receiving path and especially with the AGC-unit therein. Here, the problem is more severe since the received signal level is not known in advance, but should be tuned within the preamble of the received data transmission burst. The base-band unit of the transceiver should carry out several tasks within processing of the preamble including preamble detection, timing acquisition, carrier offset acquisition, etc. This should be done on the one hand within a time limited preamble and on the other hand under very challenging noise conditions. The conditions are severe since the UWB typically relies on processing gain of some spreading modulation resulting in data rates that are significant lower than the utilized bandwidth.

Analog-Signal-Level Detection (within Receiver):

An additional challenge for the AGC mechanism is the fact that signal measurement at the digital domain—that is after the analog to digital conversion (ADC) of the transmitted signal—does not necessarily determine the optimal setup of the programmable gain amplifiers (PGA) along the receive path within the AFE-unit. The reason for this ambiguity results from the mutual detection of the in-band signal and an attenuated out of band signal without the ability to differentiate between these two signals. Miss-selection of the PGA-levels may result in signal compression along the receiving path.

DC Offset-Cancellation (Within Receiver):

Sometimes the AFE-receiver causes a DC-offset at the ADC input to a greater or lesser extent. However, such a DC offset either reduces the effective dynamic range of the ADC or potentially saturates the signal in a way that even no signal is received. To prevent this effect there is a need for a DC offset cancellation in the receiving path. However, treating a DC offset for the multi-band OFDM is a challenging task as a result of the very fast band hopping (the DC offset is typically band dependent) and since the offset depends on the setup of the programmable gain amplifiers (PGA) along the receiving path and should therefore be acquired on a burst basis within the preamble signal.

Hopping Commands:

The base-band unit uses the preamble signal to identify the hopping time of the received signal, and additionally selects the hopping timing for enabling good performance. Therefore the base-band unit should command the AFE-unit by means of a hopping signal. Here, a main challenge lies in the provision of an accurate hopping time with a low rate signal.

As mentioned above, UWB-communication systems offer in contrast to previous digital communication systems significant higher data rates, however at the price of larger bandwidths, shorter settling times and higher frequency hopping rates. For these increased requirements of the over-all system more sophisticated, interfaces between the individual parts of this system are necessary.

A transceiver typically represents a fundamental part of a communication system. The digital transceiver comprises a base-band processor (base-band, BB-unit) and a radio transceiver unit (RF-unit). The base-band processor manages the base-band data stream and controls the function of the RF-unit. The RF-unit requires a special configuration and control apparatus for its function. In some implementations the RF-unit and the BB-unit of a digital transceiver are implemented on separate chips. This has both, advantages and disadvantages. In any case this also requires a sophisticated and well-defined interface between the RF-unit and the BB-unit in order to not reduce the required system performance.

Even if the interface between the RF-unit and the BB-unit—hereinafter referred to as RF-base-band-interface—is similar to single-chip solutions being entirely on the same chip it requires careful considerations.

For previous digital communication systems the performance requirements were much more relaxed and therefore a larger variety of different data and control interfaces emerged.

3. Related Art

In the prior art different kinds of data interfaces exist. Some of them are described below:

a) Unmodulated Coded Bit Stream:

Systems which employ relatively simple modulation schemes (i.e., schemes which do not require high computation power for modulation/demodulation) may have the modulator/demodulator implemented on the RF chip. An example of this is a Bluetooth system which might apply a relatively simple interface.

b) Analog Differential I/Q Interface:

Some systems (e.g. OFDM-systems) employ more complex modulation schemes which usually perform the modulation/demodulation digitally on the base-band chip. These systems consequently require an analog interface for the modulated signals. One way to perform this task is to split the signal in so called I-parts and Q-parts (whereas I-parts refer to in-phase parts and Q-parts refer to quadrature-parts) and to interface this signal as analog differential signal either at base band frequencies or at a (relatively low-) intermediate frequency (IF). This interface scheme is very common for relatively high data rate systems, e.g. a wireless LAN system.

c) Digital I/Q Interface:

These systems are similar to the systems having analog differential I/Q interfaces (see above under b). However these signals are interfaced digitally—either parallel or serial.

Besides the above mentioned interfaces for the received data and the transmitted data stream also an interface for the various control signals and clock signals for the communication system is required. In particular, these are the following signals: system clock signal, bus clock signal, data receive/transmit enable signal (RX/TX enable), power-down signal stand-by signal, reset signal, transmit power control signal, RSSI-signal (RSSI=received signal strength indicator), signal for the desired received/transmitted (RX/TX) frequency band, signal for the desired operation mode, signals for transceiver calibration (e.g. gain control, offset cancellation and equalization signals).

In the prior art there are also different kinds of control and clock interfaces. In traditional non-hopping communication systems the control signals can be transmitted relatively slowly. Even in traditional frequency-hopping systems the hopping rate is slow enough to allow the transfer of these control signals on a per-burst base. This scheme allows relatively high flexibility. Additionally this also requires only low computational capabilities on the RF transceiver side. On the other hand, however, the maximum hopping rate is limited by the speed of this control interface.

FIG. 1 shows a schematical timing diagram illustrating the data communication between the RF-unit and the base-band unit of a transceiver using an interface according to the state of the art and thus illustrating the above mentioned problem.

In FIG. 1 the control signal part is referenced with reference Number A and the data signal part is referenced with reference Number B, C. The data communication is carried out in a burst-like mode splitting the data stream in a plurality (here three) data bursts B, C. The control signals A contain all control information for performing the data communication and especially the frequency hopping, such as the hopping frequencies the beginning and/or the end of a data burst, the duration of a data burst, the distance between the end of one data burst and the beginning of the following data burst, etc. The duration of a control signal is reference with G.

The data bursts B represent the data communication within the transceiver that is the data communication (receiving and/or transmitting) between the RF-chip and the base-band chip of the transceiver. Reference number C is directed on the data communication of the transceiver via the wireless interface that is the bursts C represent the received and/or transmitted data via the wireless interface. These transmitted and received data C have different frequencies f1, f2, f3 bands from one burst to the other. This technique of burst-like data communications using different channels is well known in the art and is illustrated in FIG. 1 by means of the upper vertical axis referenced with the transmit and receive frequencies f_TX, f_RX, respectively. The different frequencies f1, f2 f3 define respective communications channels. This technique is also known in the relevant art as band hopping technique or frequency hopping technique.

As shown in FIG. 1 and mentioned above the data communication is being controlled by control signals A. These control signals A are typically provided by the base-band unit. Typically, there exist a slight overlap D between the timing of the control signals A and the corresponding data bursts B, C.

To perform the data communication within the transceiver a defined time gap E between one data burst B, C and the following data burst B, C is needed for the control signals A preceding the respective data burst B, C.

The prior art data communication concepts like the one described with respect to FIG. 1 all have the disadvantage that they do not allow at all the required short response times or at least only at the cost of a significant higher number of parallel interface lines. However, this is often not tolerable since this consequently goes along with significant higher costs of the transceiver and thus the whole communication system. Typically, this is also not accepted by the customers.

The above mentioned data communication concepts having a transceiver including at least two chips—a RF-unit and a base-band unit—as well as data, control and clock interfaces arranged in between these two chips are widely known and are described in the prior art for example in WO 98/15105, WO 02/05513 A1, U.S. Pat. No. 5,923,761, WO 02/056488 A3, WO 03/063461 A1, WO 99/18744, US 2004/0013177 A1.

BRIEF SUMMARY OF THE INVENTION

Accordingly it is an object of the present invention to provide an OFDM-transceiver for a better data communication between an RF-unit and a base-band unit of the transceiver.

It is a further object of the present invention to provide an OFDM-transceiver which is able to better support high speed data communication.

It is a further object of the present invention to provide an OFDM-transceiver having a more effective internal interface between a RF-unit and a base-band unit.

It is a further object of the present invention to provide a better and especially a more effective control mechanism for the RF-unit and/or the base-band unit of an OFDM-transceiver.

At least one of the afore-mentioned objects is solved by a transceiver having the features of claim 1.

Accordingly, the present invention provides a transceiver, comprising a RF-unit arranged on a first chip, a base-band unit arranged on a second chip, a bidirectional operable data and control interface arranged between said first and said second chip having at least one data line for data communication, at least one control line for controlling the data communication and at least one clock line for providing a clock signal, memory means implemented within said RF-unit containing all required chip settings which are specific to a certain frequency of received and/or transmitted data being part of the intended hopping sequence.

According to the present invention memory means are implemented within the RF-unit. This memory means, e.g. a look-up table, contain all the required chip settings which are specific to a certain frequency of the receive and/or transmit data (RX/TX-frequency) being part of the intended hopping sequence. These chip settings are for example the hopping frequency, the gain, the offset, etc.

The memory means are programmed during an initialization phase during the set-up phase of the communication link, e.g. through a relatively slow control interface. This slow part of the control interface might still allow updates of the memory means between the different bursts of the receive and/or transmit data. However, the control information needed for these updates are very small compared to the full control information for controlling the data communication. During the data communication the base-band unit only needs to provide the address of the memory means where a consistent set of parameters is stored for the frequency of the next pulse through the fast part of the control interface.

If the precise hopping sequence is known during the initialization phase the read-out addresses of the memory means might also be provided by a state machine while the base-band unit would only need to provide some synchronization signals.

In an embodiment control means for programming said memory means during an initialization phase during a set-up of a communication link of said data communication are provided.

In a further embodiment the memory means contain a look-up table.

In a further embodiment the memory means and/or the look-up table (LUT) contain a RAM-memory or a SRAM-memory. Alternatively, the look-up table may contain another memory means, such as a DD-RAM, etc.

In a further embodiment the memory means is provided for each (e.g. UWB) frequency band used to store values for the fast hopping transceiver chip. Alternatively, different sections in the memory device are used for the implementation of the different look-up tables.

In an embodiment the chip settings contain at least one of a hopping frequency, a gain and/or an offset.

In an embodiment a state machine is provided for providing the read-out addresses of the memory means if the precise hopping sequence is known during said initialization phase.

In an embodiment the state machine is a program controlled device, especially a microprocessor, a microcontroller or alternatively a hard wired programmable logic unit such as a FPGA or a PLD.

In an embodiment the transceiver is a wireless modem or part of a wireless modem.

In an embodiment the transceiver is part of an OFDM based communication system, especially of a multi-band OFDM based communication system.

In an embodiment the transceiver is an UWB based transceiver.

In an embodiment at least two phases during operation are provided: The first phase for acquiring correct values and for setting these values into the memory means (lookup table). The second phase for hopping to different hopping frequencies (TX/RX frequencies) of the data bursts while controlling the RF-unit by different sets of parameters read out from the memory means.

In an embodiment an amount of 3*Nt programmable registers are provided within the AFE-unit that store the transmit PGA-levels for each one of the 3 bands, and are programmed by the base-band unit in an initialization procedure. Nt refers to the amount of programmable amplifiers.

In an embodiment a control signal register is provided from the base-band unit to the RF-unit that shuts down the Q-channel in the transmit path. This is useful for saving power purposes e.g. in low data rate modes.

In an embodiment an amount of 3*Nr programmable registers are provided in the AFE-unit that store the receive PGA-levels for each one of the three frequency bands and which typically are programmed by the base-band unit in a specially provided initialization procedure. Nr refers to the amount of amplifiers that are programmable by the base-unit.

In an embodiment M additional sets of programmable registers are provided for M measurement setups of the receiver PGA.

In an embodiment a doubled amount of base-band receive measurement setup registers in used. This is useful for enabling simultaneously measurement by the in-phase signals (I-signals) and the quadrature signals (Q-signals) using two independent gain setups.

In an embodiment analog signal level indication are communicated from the AFE-unit to the base-band unit. This is useful for enabling an efficient AGC procedure managed by the base-band unit, especially under uncertain out-of-band signal levels.

In an embodiment dual mode AC-couplers are provided that cancel the DC-signal at the receive path. In this embodiment the dual mode AC-couplers support two modes, whereas in the first mode (mode A) the final offset is memorized and in the second mode (mode B) the AC-couplers reuse the memorized offsets that are associated with the demodulated band.

In a further embodiment a dual-mode is provided that further shifts between several offset estimation methods while being operated in the first mode.

In an embodiment a single control line is provided defining the frequency hopping. Especially, the single control line defines frequency hopping in 528 MHz timing resolution using a serial transmission at 132 MHz rate. The serially transmitted information includes for example accurate hopping time, which of the frequency band is used, the used AGC policy, etc.

In an embodiment the transceiver comprises a AFE-unit, wherein said AFE-unit comprising a set of DC offset cancellation units to reduce the DC offset.

In an embodiment the DC offset cancellation units having at least two modes during operation of said transceiver, wherein in the first mode said AFE-unit compensates the DC offset based on the instantaneously estimated value, and wherein in the second mode B the AFE-unit reuses the DC offset estimates that are memorized for the used frequency band.

In an embodiment a dual-mode is provided that further shifts between several offset estimation methods while being operated in said first mode.

Accordingly, the present invention further provides a method for operating a transceiver according to the present invention, having at least two phases during operation of said transceiver: a first phase for acquiring correct values and for setting these values into said memory means; a second phase for hopping to different hopping frequencies of the transmitted data bursts while controlling said RF-unit by different sets of parameters read out from said memory means.

BRIEF DESCRIPTION OF THE FIGURES

Exemplifying embodiments of the present invention will be described below with reference to the accompanying drawings, in which.

In the drawings identical and/or similar features are—as far as nothing else is set forth—indicated with the same reference numbers.

DETAILED DESCRIPTION OF THE INVENTION

Figure 2:
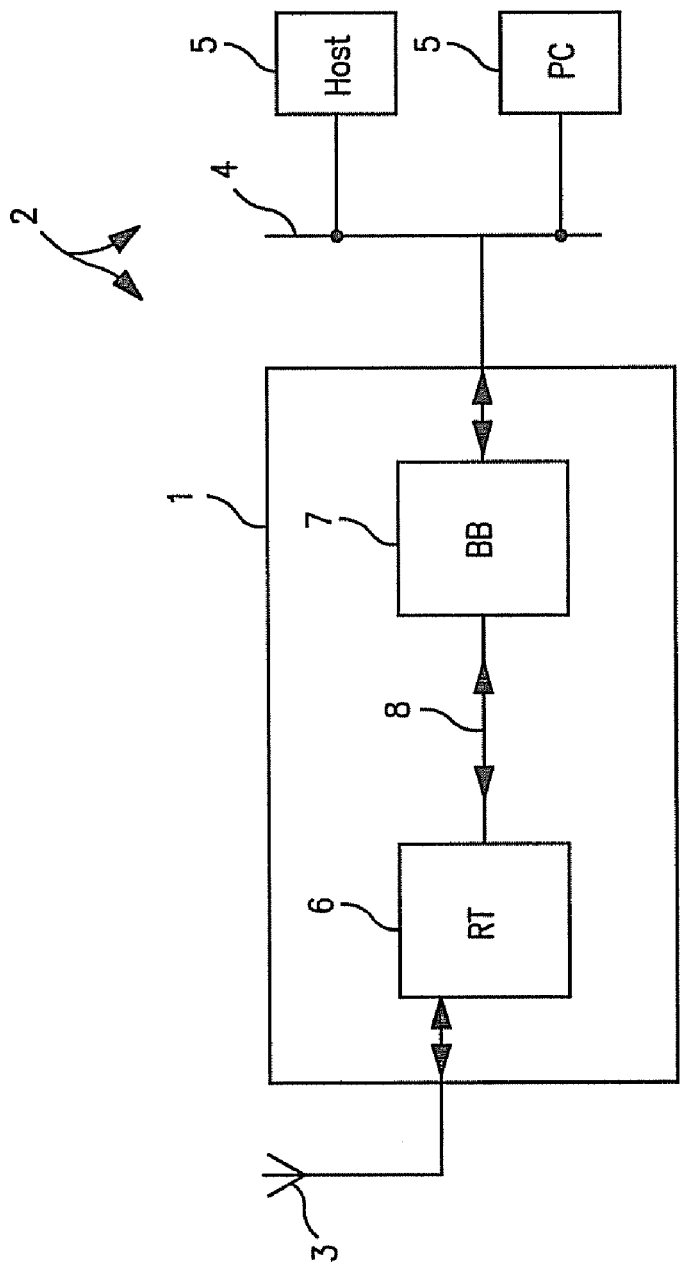
FIG. 2 shows a block diagram illustrating the principal arrangement of a transceiver according to the present invention within a wireless data communication system.

FIG. 2 shows a block diagram illustrating the principal arrangement of a transceiver according to the present invention within a wireless data communication system.

In FIG. 2 a transceiver is described with reference number 1. In the present embodiment this transceiver 1 is arranged within a multi-band OFDM communication system 2 whereas FIG. 2 shows only a part of this communication system 2. It is assumed that in communication system 2 is a WLAN-system, for example a TDMA-system however, also others communications system standards may be possible. The transceiver comprises an antenna 3 representing the wireless interface to other transceivers coupled with the transceiver 1 and belonging to the same communication system 2. On the other side the transceiver 1 is connected to a bus system 4 which serves as an internal interface between the transceiver 1 and other host components 5, such as e.g. a personal computer, a facsimile, an internet terminal, a telecommunication system, etc.

The transceiver 1 further comprises an internal RF-unit 6 and a base-band unit 7. The RF-unit 6 is connected with the antenna 3. The base-band unit 7 is connected with the bus system 4.

The RF-unit 6 and the base-band unit 7 are each integrated in a separate single chip, that is a first chip for the RF-unit 6 and a second chip for the base-band unit 7. The RF-unit 6 and the base-band unit 7 are connected via an internal interface 8 (of the transceiver 1), according to the present invention. The detailed arrangement and function of this interface 8 which consists of a bus 8 having data lines, control lines and clock lines is described later, especially with respect to FIGS. 3 and 4.

Figure 3:
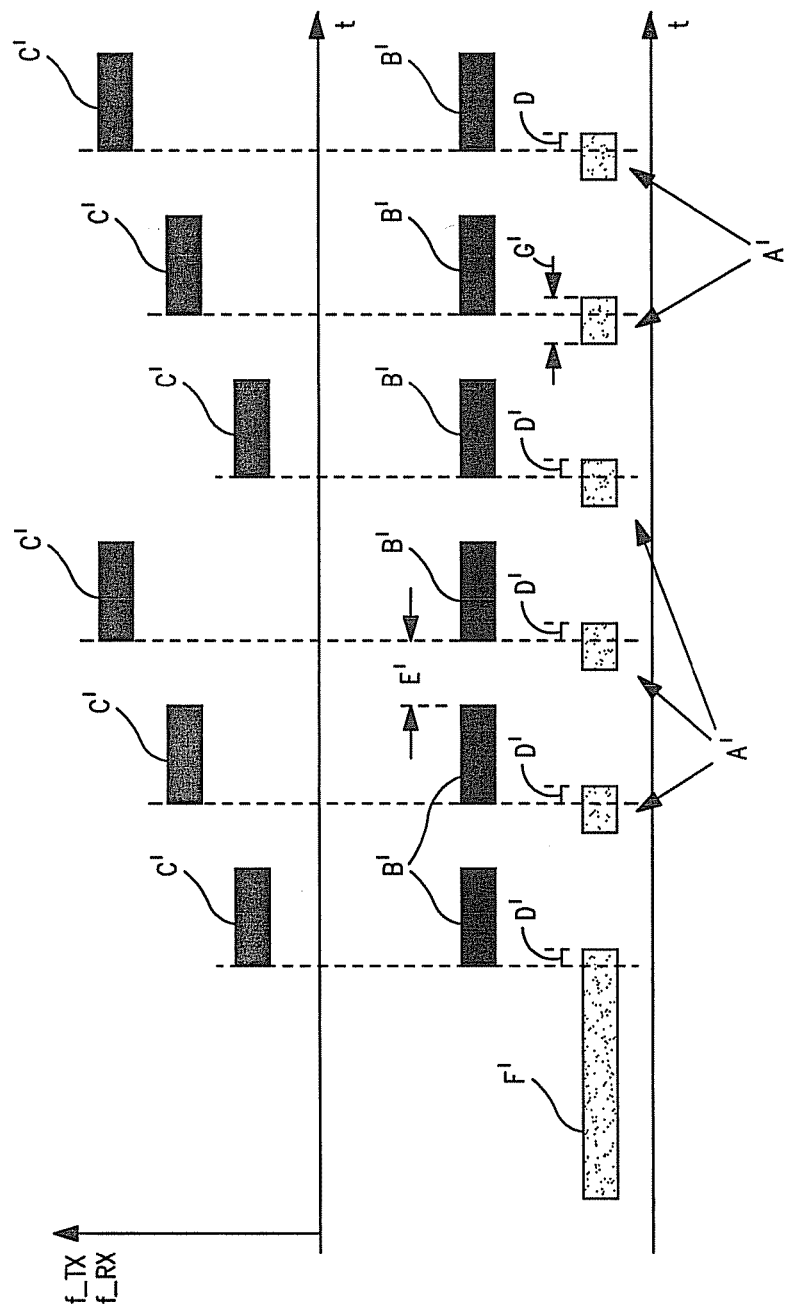
FIG. 3 shows a schematical timing diagram illustrating the data communication between the RF-unit and the base-band part of the transceiver of FIG. 2 using an interface according to the present invention.

FIG. 3 shows a schematical timing diagram illustrating the data communication between the RF-unit and the base-band part of the transceiver of FIG. 2 using an interface according to the present invention.

Figure 1:
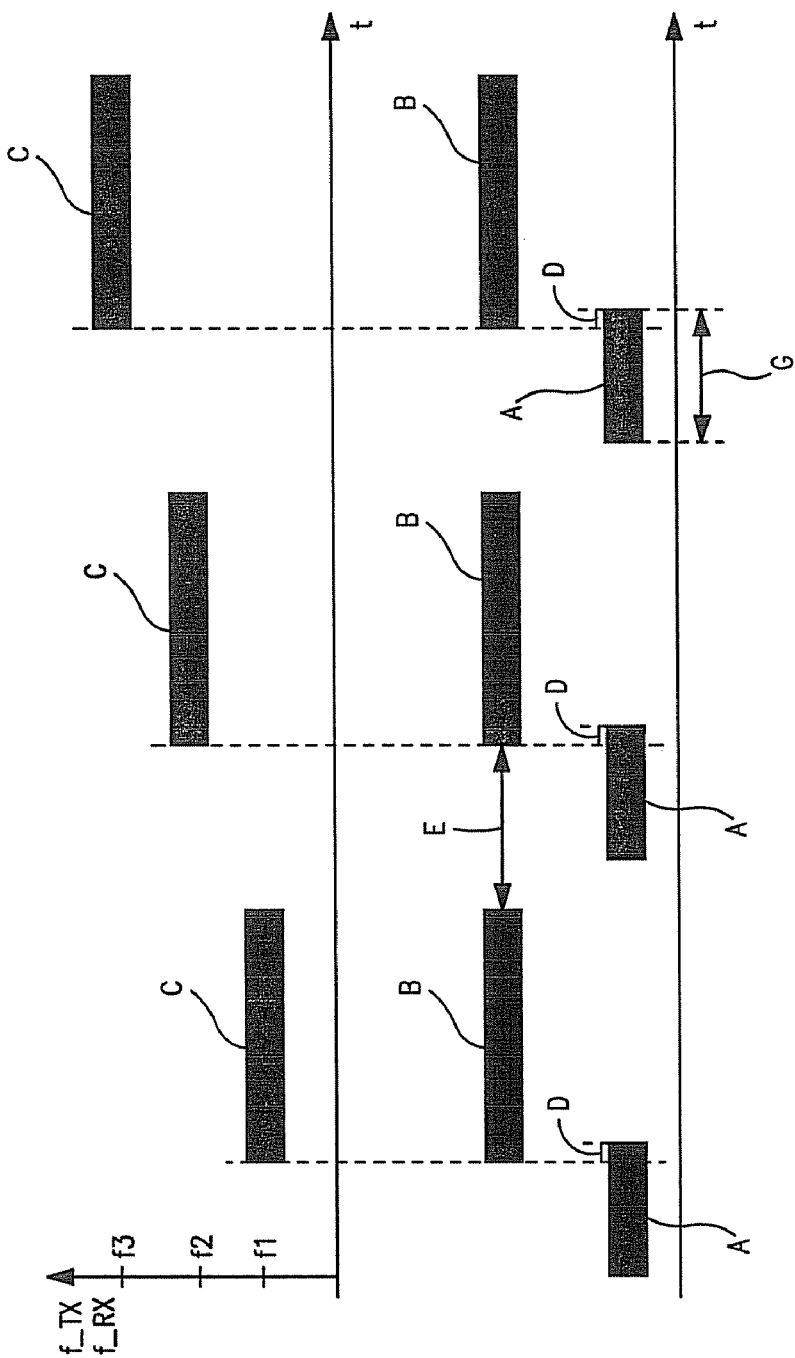
FIG. 1 shows a schematical timing diagram illustrating the data communication between the RF-unit and the base-band unit of a transceiver using an interface according to the state of the art.

FIG. 3 shows the scenario for a very high speed data communication of the transceiver 1. In contrast to the timing diagram in FIG. 1 the different data bursts B', C' are smaller with respect to the duration having the consequence that also the time gaps E' between one burst B', C' and the subsequent following burst B', C' are much smaller. These smaller time gaps E' typically are not large enough for oversending the whole control information A (see FIG. 1) for the corresponding data bursts B', C'.

According to the present invention, at the beginning of a data communication an initialization of the receive path and transmit path of the RF-unit 6 is carried out by sending an initialization signal F'. This initialization signal F' already contains all the required RF-chip settings which are specific to a certain frequency of the receive and/or transmit data (RX/TX-frequency) being part of the intended hopping sequence. These chip settings are for example the hopping frequency, the gain, an offset, etc. After this initialization only very small control information A' is needed for the update of the initialization. D' again shows the overlap between the timing of the control signals A', F' and the corresponding data bursts B', C'. For transmitting these control information A' only a very short time slot G' is necessary. This update of the initialization is being advantageously performed via a relatively slow control line.

Figure 4:
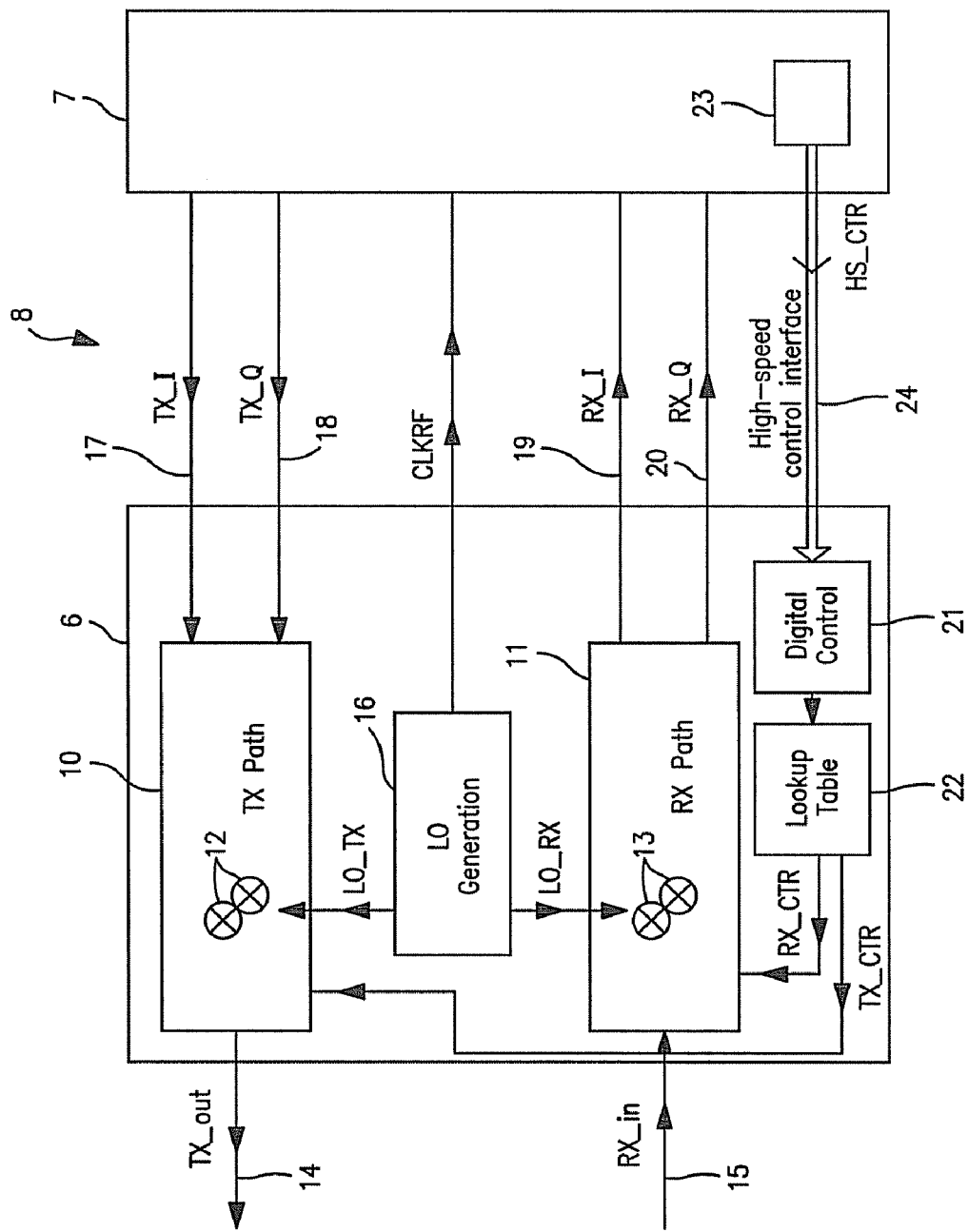
FIG. 4 shows a detailed block diagram illustrating a preferred embodiment of the transceiver unit according to the present invention.

FIG. 4 shows a detailed block diagram illustrating a preferred embodiment of a transceiver of FIG. 2 unit according to the present invention including a RF-unit having a look-up table and a base-band-unit having control means.

The RF-unit 6 of the transceiver 1 comprises a transmit (TX) path 10 and a receive (RX) path 11. Both, the transmit path 10 and the receive path 11 include mixer means 12, 13 for mixing the transmitted signals and received signals, respectively. The transmit path 10 and the receive path 11 within the RF-unit 6 are connected with the antenna 3 via transmission lines 14, 15 for transmitting data signals TX_out and receiving data signals RX_in. Internally, the transmit path 10 and the receive path 11 are connected to the base-band unit 7 via several data lines 17-20 of the internal bus 8. Via the data lines 17, 18 data signals TX_I, TX_Q provided by the base-band unit 7 are coupled in the transmit path 10. Correspondingly, via the data lines 19, 20 data signals RX_I, RX_Q received by the receive path 10 are provided to the base-band unit 7.

The RF-unit 6 further comprises a local oscillator 16 for providing internal clock signals LO_TX, LO_RX for controlling the corresponding mixers 12, 13. The local oscillator 16 may also provide an reference clock signal CLKRF which may be used by other components of the transceiver 1 such as the base-band unit 7.

Additionally or alternatively, the clock signals LO_TX, LO_RX, CLKRF may also be provided by an external clock generator, e.g. an external crystal quartz device.

The index "I" and "Q" in the signals TX_I, TX, Q, RX_I, RX_Q refers to the I-path and Q-path, respectively, of the data transmission path.

According to the present invention, the RF-unit 6 has digital control means 21 and memory means 22 connected downstream to the digital control means 21. In a preferred embodiment the memory means 22 comprise a look-up table (LUT). The digital control means 21 are connected to a signal processing device 23 within the base-band unit 7 via control lines 24 of the bus 8. The signal processing device 23 generates control signals HS_CTR for the high-speed control of the RF-unit 6. These control signals HS_CTR are coupled in the control means 21 which provides corresponding data to be shared in the memory means 22.

In an embodiment the memory means 22 comprises a look-up table 22 which table has different content for the I-path and the Q-path. The control data RX_CTR, TX_CTR stored in the memory means 22 is used in high speed mode of the transceiver 1 and the RF-unit, respectively, for controlling the data communication between the receive unit 11 and the transmit unit 10 of the RF-unit 6 on the one side and the respective units (not shown in FIG. 4) of the base-band unit 7 on the other side.

The look-up table 22 contains all the required chip settings which are specific to a certain frequency of the receive and/or transmit data (RX/TX-frequency). The look-up table 22 is programmed during an initialization phase during the set-up of the communication link, e.g. through a relatively slow control interface. This slow part of the control interface (not shown in FIG. 4) might still allow up-dates of the look-up table 22 during the normal fast high frequency data communication. However, the control information for these up-dates are very small. During the communication the base-band unit only needs to provide the address of the memory means 22 where a consistent set of parameters is stored for the frequency of the next pulse through the fast part of the control interface. If the precise hopping sequence is known during the initialization phase the read-out addresses of the memory means might also be provided by a state machine while the base-band unit would only need to provide some synchronization signals.

Following, some preferred embodiments of the interface 8 between the RF-unit 6 and the base-band unit 7 according to the present invention are described:

During the preamble portion of the transmitted data burst a high speed interface requires to program and also write data into the look-up table 22.

For hopping commands signaled by the interface there exist two options: Firstly, an order of the band hopping is sent with every transmitted and received data burst. Secondly, the sequence of the band hopping is stored in the memory device 22.

The hopping commands are generated by a state-machine inside the RF-unit 6. The state-machine may be a program controlled device, such as a microprocessor, a microcontroller, or alternatively a hard wired logical unit such as a PLD or a FPGA.

The interface 8 between the base-band unit 7 and the RF-unit 6 comprises the following signals and components which are described especially on the basis of the detailed embodiment according to FIG. 4. However, it is to be understood that the invention in general and the detailed interface is not restricted on this detailed embodiment since this should only better illustrate the core of the present invention:

Data Signal:
The interface is constructed either in the form of a broad-band differential analog I-Q interface for the transmitted data path (TX) and the received data path (RX) and/or in the form of a high-data-rate digital interface.

RX PGA Control (PGA=Programmable Gain Amplifier):
The interface contains registers that select the set of PGA-levels per frequency band. This component contains also registers that select a set of PGA-levels for the signal strength measurement, including a different set for the I channels and Q-channels.

TX PGA Control:
The interface contains registers that select the set of PGA-levels per frequency band (e.g. for pre-equalizing). Especially, three registers are provided that report the detected output power level in each frequency band.

DC Offset Indication:
Here, a 1-bit register is provided that selects whether the next hopping/gain change is associated with a memorized DC-offset or not. This component contains also registers that select the sequence of offset estimation methods from the hopping incident (e.g. duration and estimation method). Not every RF-unit has to support the full sequence.

Hopping Command:
Hopping commands having a 528 MHz resolution may be used whereas for these hopping commands only a single pin at a 132 MHz connection is necessary. A serial sequence of 6 bits with a leading "1" defines the hopping band (2 bits), the 528 MHz phase with respect to the 132 MHz cycle (2 bits) and the PGA mode. For this, either the gain level associated with the frequency band or the gain level for measurement (1 bit) purposes is used. Further, a register that selects the band grouping.

RSSI-Signal:
Here, two readable registers are used that hold a short term measurement of the signal level at two points along the RX-chain. An RF-unit chip implementer that does not provide one (or two) of the two registers will use zero as the register content.

RX/TX Enable Signal:
To generate the RX/TX enable signals a two bit register is used that selects either the data transmit path (TX) or the data receive path (RX) or none of them.

Clock Signal:
A 2112 MHz clock signal may be supplied by the RF-unit. This clock signal is being provided by a an internal phase-locked loop (PLL) circuit. Additionally, it is advantageous that a control circuit provides control signal for indicating that the PLL-circuit is locked.

Alternatively or additionally this clock signal may also be provided by an external unit such as an external quartz crystal.

Alternatively or additionally a register is used for selecting a sleeping mode of the RF-unit and the whole transceiver, respectively. In an embodiment the clock pin supplies the RF-unit and the whole transceiver, respectively, with a slower clock (within the same pin) for at least one sleeping mode.

Power Down and Stand-by Signals:

These signals allow to support an intelligent power management to save power for example by turning off circuit blocks during those times that are not used.

Pre-Equalization (within the Transmit Path):

Within the transmit path in the AFE-unit there is one or more programmable amplifiers, named PGA-units (programmable gain amplifier). IT is assumed that there are an amount of Nt programmable amplifiers. The AFE-unit holds a set of 3*Nt registers that are programmable by the base-band chip. These registers determine the used PGA-level for each PGA-units for each band (out of the 3 bands) in the transmit path. These registers are programmed within an initialization phase by the base-band unit. While transmitting a burst, the AFE-unit uses the proper PGA-levels based on the temporal used band (out of 3 possible bands).

This method avoids the need of fast communicating the required PGA-levels while transmitting a burst, and therefore avoids the need for fast communication between the two units (the base-band unit and the AFE-unit).

The low data rates of the multi-band OFDM typically work within a very noisy environment, and especially for those cases where the noise level is significantly higher then the signal level. For such conditions a high spread spectrum factor is used. One of the means for getting high processing gain is achieved by frequency spreading techniques that use conjugate symmetry nature in the frequency domain. This enables the receiver to combine the received signal in two distant frequencies (i.e. frequency tones) within the OFDM symbol in a way that provides a processing gain. This conjugate symmetry in the frequency domain results in a real signal in the base-band.

Additionally, to save power consumption, a register in the RF-unit that is programmable by the base-band unit, specifies whether the base-band signal is a real or a conjugate complex signal. If the signal is a real signal, the RF-unit shuts down one of the branches in the RF-unit. In a preferred embodiment of the invention, the Q-channel is therefore shut down.

Figure 5:
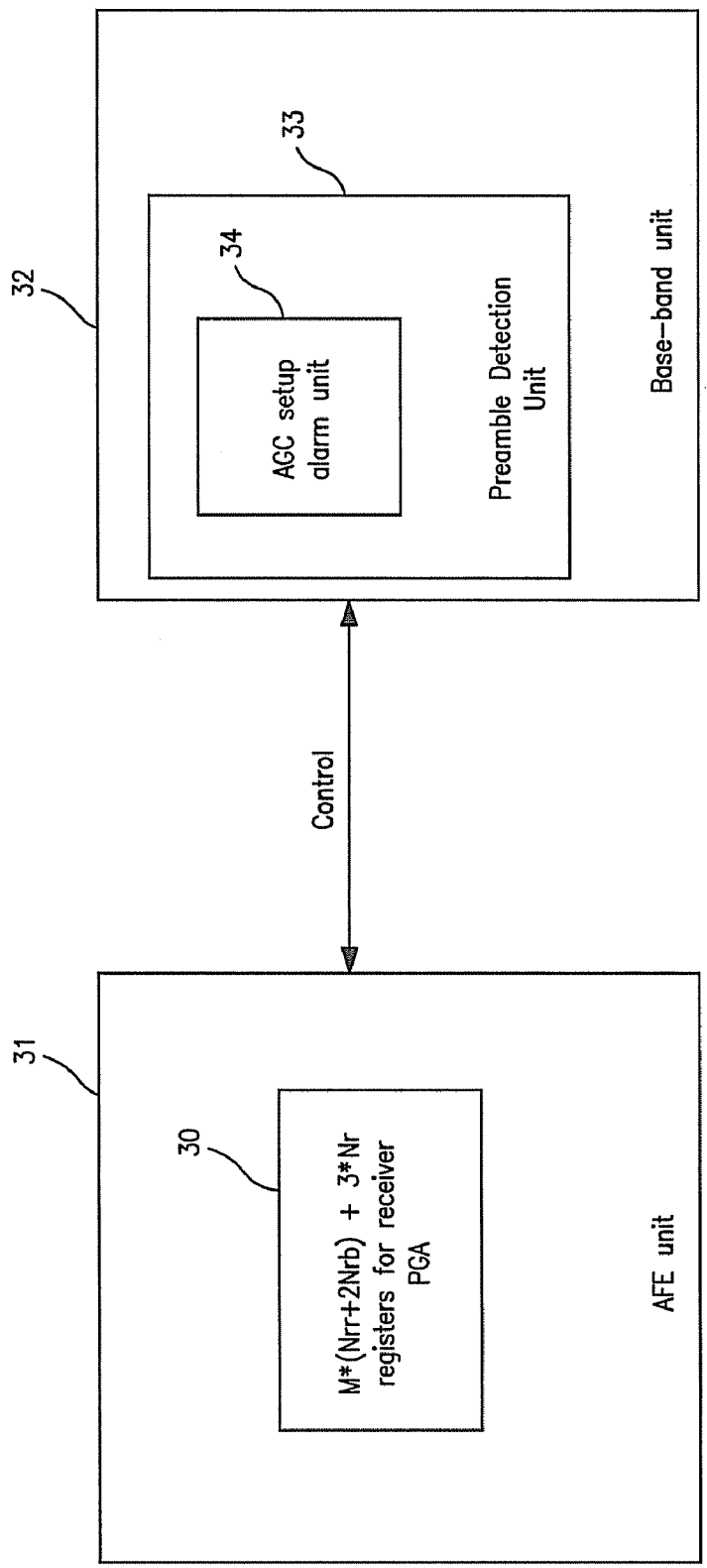
FIG. 5 shows the automatic gain control (AGC-unit) within the transceiver according to the present invention.

AGC (Within the Receive Path):

FIG. 5 shows a very general block diagram that describes this interface for the receive path AGC tasks. According to the present invention, a similar solution is given for the transmit path. Here, the programming of the PGA-unit 30 programming is done within the preamble processing time, based on the received signal level. The goal is then to optimize the signal quality in the base-band unit.

A set of Nr PGA-units are used within the AFE-unit 31 in the receive path. Thus, the AFE-unit 31 holds all together a set of 3*Nr registers that are programmable by the base-band unit 32. These registers determine the used PGA-level for each PGA-units 30 in each band (out of the 3 bands) in the receive path.

The solution described so far still demands fast control communication between the AFE-unit 31 and the base-band unit 32. This demand comes up from the following AGC procedure.

Within the base-band unit 32 there is a preamble detection unit 33 that searches for a preamble signal. Typically, the preamble is received after the preamble detection unit 33 has been activated. At this time the PGA-unit 30 may be set to a level that is not fitting the preamble signal. A sub-unit 34 within the preamble detection unit 33, called AGC setup alarm unit 34, detects the need for executing a setup of the AGC-unit. This AGC setup alarm unit 34 is active within the preamble detection search period. While the AGC setup alarm unit 34 detects the need for an AGC (e.g. when the signal level at the ADC is too high, or when the signal is too low for some predefined period of time) there is a need to run an AGC procedure for changing the PGA-units 30 programming within the receive path.

From the time that we get an AGC setup alarm, there is an urgent need to fast tune the PGA-levels for enabling signal level measurement at the ADC output. The need for the short time requirements comes from the need to measure the signal level within a duration of a single OFDM symbol from the time that the high level signal entered the AGC setup alarm unit, otherwise the measurement may miss the high level signal. This requirement results from the frequency hopping nature of the transmitted signal.

For enabling this fast switching of the receiver PGA-levels while still using a slow inter-units control connection, the AFE-unit holds a set of M*Nr programmable registers that hold the PGA-levels for M measurement setups. Instead of informing the AFE-unit the PGA-unit setups for the measurement period, the base-band unit informs the AFE-unit to use the selected measurement setup. This reduces the required communicated information between the units.

The typical ratio between the received signals from a close transmitter and from a distant transmitter is high, that is the dynamic range of the received signal is large. Such conditions are traditionally solved according to the prior art by using a multiple number of signal measurements for tuning the PGA-levels. Yet, there is a motivation to reduce the number of signal level measurements. This shortens the time that the AGC task consumes from the entire preamble processing. Alternatively, it improves the quality of each measurement by enabling longer measurement intervals.

For reducing the number of measurement iterations the information that is achieved within a single measurement interval was improved by using two different PGA-levels for the in-phase signals and the quadrature signals (typically marked by the "I"-signals and the "Q" signals). Doing this, within a single measurement interval two different independent measurements are carried out. Therefore, instead of M*Nr programmable registers that hold the PGA-levels for M measurement setups a number of M*(Nrr+2*Nrb) registers are used where Nrr is the number of PGA-units in the RF domain of the receiver path (before down conversion) and Nrb is the number of PGA-units in the base-band domain of the receive path (within the AFE, after the down-conversion mixer), with (Nrr+Nrb)=Nr.

This method actually enables an efficient single measurement of a sufficiently large dynamic range by a single measurement interval, meaning M=1. So according to an embodiment of the invention we preferably but not necessarily use M=1.

Analog Signal Level Detection (within the receive path)

The AGC-procedure involves both, the base-band unit and the AFE-unit. The algorithm and the gain selection is made within the base-band unit, while the PGA-units themselves are located in the AFE-unit. The decision within the base-band unit is primarily based on digital signal level detection within the base-band unit that is applied on the output of the ADC-unit (ADC=analog to digital converter). However, this signal detection is not sufficient for optimally selecting the PGA setting along the receive path, because of the uncertainty regarding out-of-band signals which are attenuated before sensed at the ADC-unit. Therefore, the AFE-unit provides an analog signal level detection that is done at one or more points along the receive path within the AFE-unit. This information is communicated to the base-band unit. The analog signal level indications that are communicated to the base-band unit describe short-term signal level detection.

DC Offset Cancellation (Receiver)

Within the AFE-unit, there is a set of $N_{dc}$ DC offset cancellation units that are used to reduce the DC offset. These units have two operation modes:

Mode A (First Mode):

In mode A the AFE-unit "memorizes" the acquired DC offset before the next band hopping command is asserted (a command from the base-band unit). Therefore, $3*N_{dc}$ memory-units are needed, that is $N_{dc}$ memory-units for each frequency band. In mode A the DC offset is compensated based on the instantaneously estimated value.

Mode B (Second Mode):

In mode B, the AFE-unit reuses the DC offset estimates that are memorized for the used frequency band.

The base-band unit, which controls the AFE-unit, programs a single bit register in the AFE-unit, that selects whether mode A or mode B is used. Typically, within the preamble detection time, the base-band selects mode A. At a certain time, within the preamble detection procedure, the base-band unit switches to mode B. Within the communication phase of burst receiving mode B is used.

Figure 6:
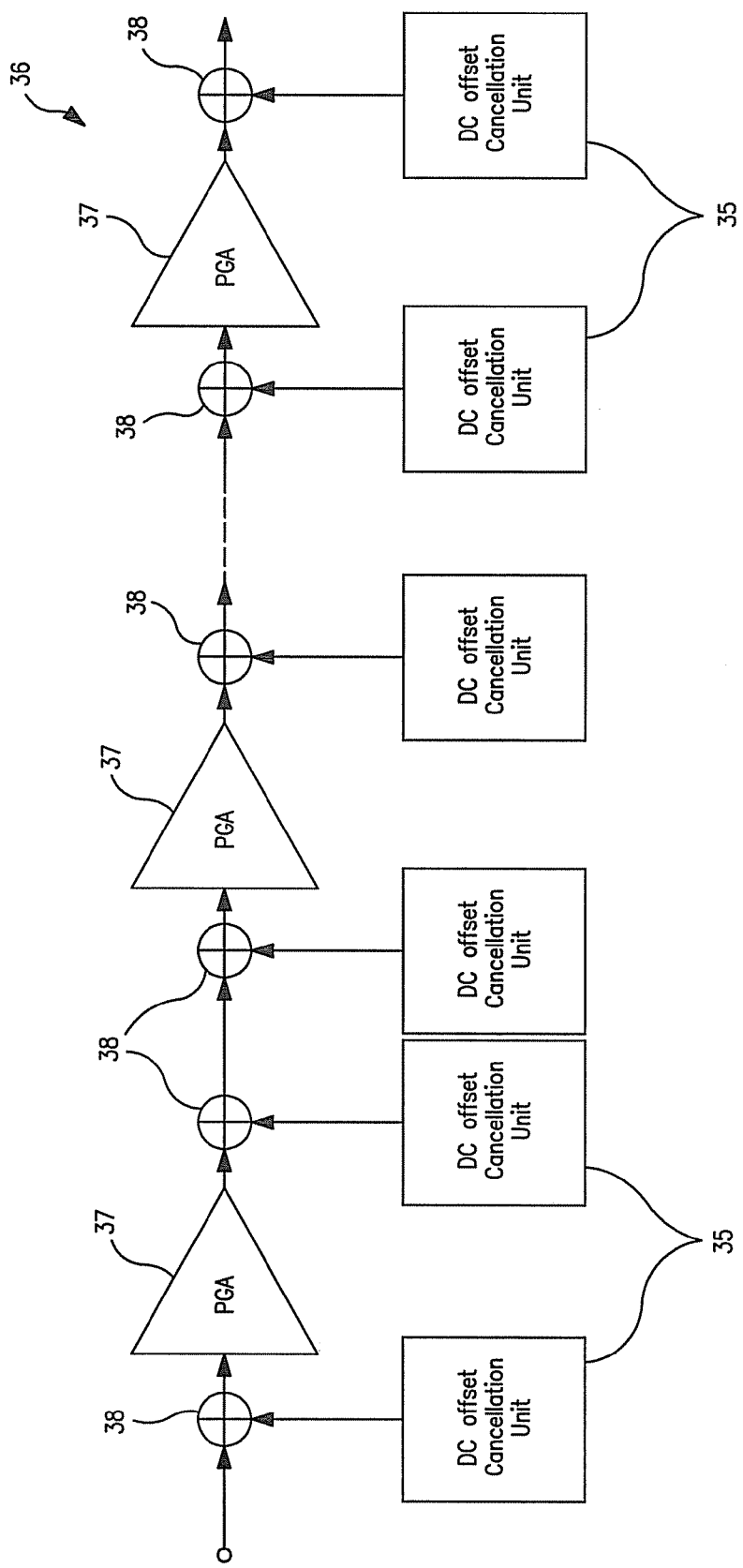
FIG. 6 shows a block diagram for performing the DC-offset cancellation within the receiver part of the transceiver according to the present invention.

FIG. 6 shows a block diagram of a circuit 36 for performing the DC offset cancellation within the receiver part of a transceiver according to the present invention. The circuit 36 has PGA-units 37 and combining means 38 (such as adders) arranged in-between different PGA-units 37 and further DC offset cancellation units 35 inputting a DC offset cancellation signal to the combining means 38. The circuit 36 in FIG. 6 enables an accurate DC offset acquisition within the DC offset cancellation units at the AFE-unit 31 in mode A. These DC offset levels are used within the communication phase (and within late tasks of the preamble processing), when mode B is activated.

The DC offset is acquired within one DC offset cancellation unit while operating in mode A, using different estimation methods. The purpose of using different methods is to optimize estimation speed and estimation accuracy. A very fast method produces a rough estimate in a very short time (say for a period of 1 ns). This rough estimate is going to be refined by using a slower but more accurate estimation method (for instance for a period of 10 ns). This estimate can be then improved by using a third estimation method for a longer time and so on.

If a hopping command occurs before the end of an estimation period of one of the methods is reached the current estimate is memorized without waiting of the end of the period and the following estimation methods. Otherwise the estimate available at the end of the period assigned to the last estimation method is memorized. Fixing for the last method a period longer than the time till the next hopping implies that the estimate stored in the memory is the estimate value at the hopping command.

A number of $K_i$ ($i=1 \ldots N_{dc}$) estimation methods implemented in each of the $N_{dc}$ DC offset cancellation units are pre-determinate in the design of the AFE-unit. The set of the $K_i$ periods may be either fixed or in a preferred embodiment of this invention these $K_i$ values are programmable. The number K of registers that need to be programmed is therefore:

$$K = \sum_{i=1}^{N_{dc}} K_i$$

By enabling this estimation method shifting within mode A certain tasks are enabled that require low signal quality within the preamble processing (such as AGC measurement or preamble detection) to be carried out very soon after a band hopping event. At the same time we end up with an accurate DC compensation which result in good performance within the more sensitive signal processing periods (such as payload demodulation with high data rate).

Figure 7:
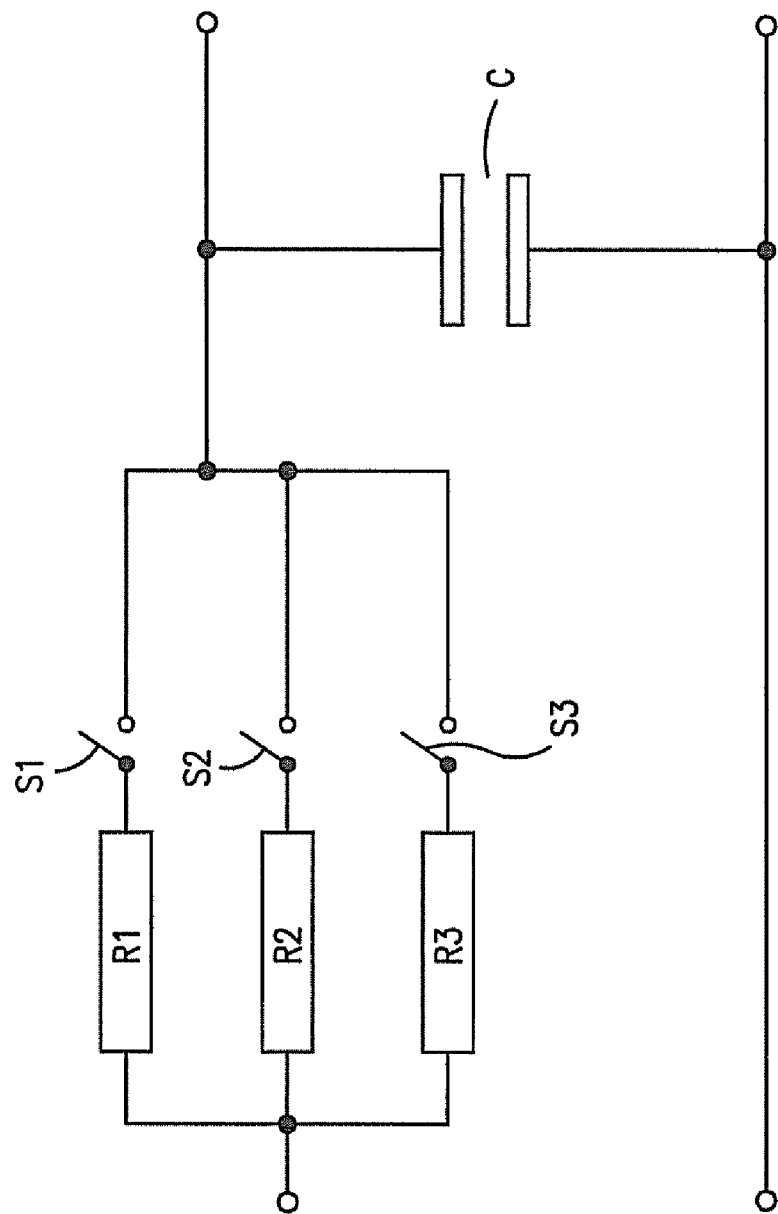
FIG. 7 shows one possible example for DC-estimation using K=3 different estimation methods.

One possible example for a DC estimator using K=3 different estimation methods is shown in the FIG. 7. The three estimation methods are represented by the three time constants R1, R2, R3 that the circuit is using. For selecting one of these three estimation methods (time constants R1, R2, R3) switching means S1, S2, S3 are used. In the present embodiment the time constants R1, R2, R3 are resistive elements such as a resistor.

Additionally, it is often useful to employ a buffering element and/or filtering element C, such as a capacitor.

A fast time constant generates rough estimations in a very short time while using a very long time constant refines the estimates to a very accurate level but requires a rather long estimation time.

Hopping Commands:

In a preferred embodiment, a frequency of 132 MHz of the control signal between the base-band unit and the AFE-unit is used. However, a timing resolution for a band hopping command with a resolution of 1/528 MHz are provided which are roughly speaking about 1.9 nsec time units.

There is a single line between the base-band units and the AFE-units that operate with a 132 MHz system clock. A serial sequence of 6 bits (for M=1) with a leading 1 defines a hopping command, where:

1 leading bit is '1'—initializing an hopping command;
2 leading bits define the hopping frequency band (either band #1, band #2 or band #3);
2 leading bits define a delay in 1/528 MHz resolution with respect to the 132 MHz cycle;
ceil(log 2(M+1)) leading bits define the AGC mode. Either use the AGC level that is associated with the frequency band or one of the AGC measurements levels. For M=1 (preferred embodiment) only one bit is used in this field.

The multi-band OFDM evolving standard defines a set of band groupings, with 3 bands in each band grouping (2 bands in the last band grouping). The AFE-unit holds a programmable register that selects the band grouping. This register is programmed by the base-band unit, using commands from the MAC (MAC=media access control) communication layer.

Above, an preferred embodiment of the transceiver and especially of the internal interface has been described. This should be seen as merely a non-limiting example. Many modifications will be possible within the scope of the invention as defined in the claims and the description without deviating from the core of the present invention.

Especially, the invention should not be restricted on the specific circuitry arrangement which shows a simplified example, which may of course be modified without drifting from the scope of the present invention. The same applies for the given figures, data and numbers which should be understood as preferable, but non-limiting examples.

What is claimed is:

1. A transmitter, comprising:
a baseband circuit arranged on a first chip;
a RF circuit arranged on a second, different chip including a memory;
a controller for programming a plurality of chip settings into the memory, wherein the plurality of chip settings respectively correspond to a plurality of time slots in a frequency hopping sequence;
a bidirectional data and control interface operably coupled between the baseband circuit on the first chip and the RF circuit on the second chip, the bidirectional data and control interface having at least one data line for data communication, at least one control line for controlling the data communication, and at least one clock line for providing a clock signal;
wherein, after the controller has programmed the plurality of chip settings into the memory, the baseband circuit provides corresponding data and control information over the data line and control line, respectively, to the RF circuit, wherein the control information reflects a chip setting which is programmed in the memory and which corresponds to a timeslot in the frequency hopping sequence during which the corresponding data is to be transmitted.

2. The transmitter of claim 1, further comprising:
a transmission path in the RF circuit to use the chip setting to modulate the corresponding data onto a frequency used during the timeslot of the frequency hopping sequence, thereby providing a modulated signal.

3. The transmitter of claim 2, further comprising:
a RF antenna operably coupled to the transmission path, the RF antenna to transmit the modulated signal to a receiver.

4. The transmitter of claim 1, wherein the control information corresponds to an address in the memory at which the chip setting is programmed.

5. The transmitter of claim 1, wherein the plurality of chip settings comprise at least one of: a frequency value or a frequency offset value, which are configured to tune the RF circuit.

6. The transmitter of claim 1, wherein the control information for the timeslot consists of only an address on the control line, wherein the address corresponds to the chip setting programmed in the memory that facilitates transmission of the corresponding data during the timeslot.

7. A receiver, comprising:
a RF circuit comprising a digital control unit, a memory, and a reception path;
a baseband circuit coupled to the reception path via a data interface and coupled to the digital control circuit via a control interface;
wherein the baseband circuit provides an initialization signal to the digital control unit over the control interface;
wherein, based on the initialization signal, the digital control unit programs the memory with a plurality of chip settings, wherein respective chip settings are to be used to receive data during respective timeslots of a frequency hopping sequence;
wherein the baseband circuit facilitates reception of data according to the frequency hopping sequence by providing control information to the digital control unit via the control interface, wherein the control information reflects a chip setting programmed in the memory and corresponding to a timeslot in the frequency hopping sequence on which data is received.

8. The receiver of claim 7, wherein the control information corresponds to an address in the memory at which the chip setting is programmed.

9. The receiver of claim 7, wherein the plurality of chip settings comprise at least one of: a frequency value or a frequency offset value, which are configured to tune the RF circuit.

10. The receiver of claim 7, further comprising:
a RF antenna operably coupled to the reception path.

11. The receiver of claim 7, wherein the control information for the timeslot consists of only an address on the control line, wherein the address corresponds to the chip setting programmed in the memory that facilitates transmission of the corresponding data during the timeslot.

12. A method, comprising:
providing an initialization signal from a baseband circuit to an RF circuit having a memory;
based on the initialization signal, programming the memory within the RF circuit with a plurality of chip settings, wherein the plurality of chip settings respectively correspond to a plurality of timeslots in a frequency hopping sequence;
after the chip settings have been programmed into the memory, providing corresponding data and control information from the baseband circuit to the RF circuit, wherein the control information reflects a chip setting which is programmed in the memory and which corresponds to a timeslot in the frequency hopping sequence during which the corresponding data is to be transmitted;
wherein the chip settings comprise at least one of: a frequency value or a frequency offset value, which are configured to tune the RF circuit.

13. The method of claim 12, further comprising:
using the chip setting to modulate the corresponding data onto a frequency used during the timeslot of the frequency hopping sequence, thereby providing a modulated signal; and
providing the modulated signal to an RF antenna for transmission.

14. The method of claim 12, wherein the control information corresponds to an address in the memory at which the chip setting is programmed.

* * * * *